United States Patent
Webster

[11] Patent Number: 5,868,294
[45] Date of Patent: Feb. 9, 1999

[54] VEHICLE UTILITY RECEPTACLE

[76] Inventor: Mary Lou Webster, 1171 Southwood Ct., Ann Arbor, Mich. 48103

[21] Appl. No.: 736,588

[22] Filed: Oct. 24, 1996

[51] Int. Cl.$^6$ ........................................................ B60R 7/04
[52] U.S. Cl. ...................... 224/275; 224/572; 297/188.06
[58] Field of Search ..................................... 224/275, 539, 224/572, 42.11; 297/188.06, 188.2, 188.01

[56] References Cited

U.S. PATENT DOCUMENTS

| | | | |
|---|---|---|---|
| 2,953,288 | 9/1960 | Peterson | 224/42.46 |
| 3,014,759 | 12/1961 | Bing | 224/539 X |
| 4,466,659 | 8/1984 | Carpentier et al. | 224/275 X |
| 5,044,321 | 9/1991 | Selph | 224/275 X |
| 5,226,576 | 7/1993 | Ellsworth | 224/572 |
| 5,312,160 | 5/1994 | Davis et al. | 297/397 |
| 5,421,638 | 6/1995 | Ayotte et al. | 297/188.04 |
| 5,490,623 | 2/1996 | McConnell | 224/275 |

FOREIGN PATENT DOCUMENTS

| | | | |
|---|---|---|---|
| 1227641 | 8/1960 | France | 224/572 |
| 2 238 993 | 6/1991 | United Kingdom | 224/275 |

OTHER PUBLICATIONS

Item #4779, "Car Activity Bag," One Step Ahead Catalog, Early Spring 1996 issue, pp. 8–9.
Item #4570, "Seat Keeper," One Step Ahead Catalog, Early Spring 1996 issue, pp. 8–9.
Item #4644 "Puff 'n Stuff," One Step Ahead Catalog, Early Spring 1996 issue, pp. 8–9.
Article, "Hello Venture," *Detroit Free Press,* Apr. 4, 1996, p. 1, Section F.
Item #V38–0004, "Pet Car Seat," R.C. Steele Catalog, Spring 1996, p. 20.
Item #V38–0433, "Car Seat Belt Easy Rider," R.C. Steele Catalog, Spring 1996, p. 20.
Item 01–120, "Tool Bucket With Belt," Gardener's Supply Company Catalog, Spring 1996, p. 2.
Item 628132, "Car Organizer," Lillian Vernon Catalog, vol. 401, 1994, p. 57.
Item 187260, "Auto Trash Bag/Tissue Dispenser," Brookstone Catalog, Winter 1995, p. 29.
Item 196949, "Back Seat Cup Holder," Brookstone Catalog No. T–2–96–C1, p. 62.

*Primary Examiner*—Renee S. Luebke
*Attorney, Agent, or Firm*—Leydig, Voit & Mayer, Ltd.

[57] ABSTRACT

A vehicle utility receptacle adapted to be mounted in a vehicle adjacent the side of a vehicle seat. The receptacle has an upward opening container with side walls and a bottom portion that joins the side walls. The receptacle also has upper and lower container-to-seat mounting assemblies attached to the container and suitable for attachment to a vehicle seat.

20 Claims, 3 Drawing Sheets

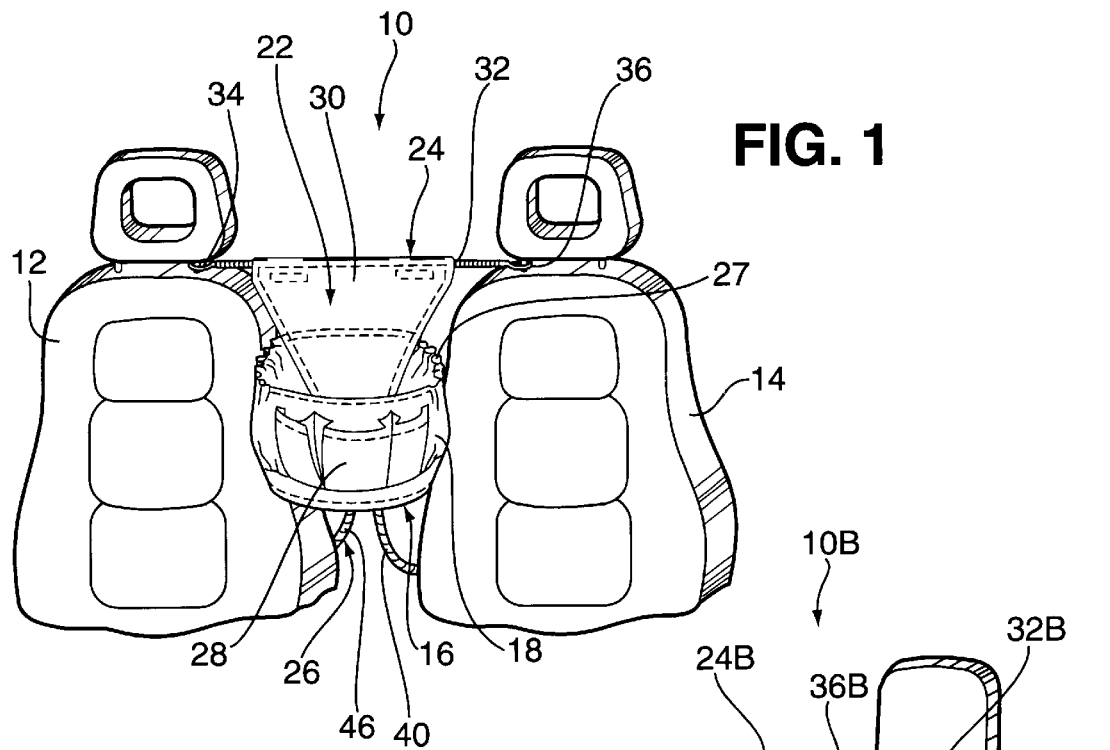
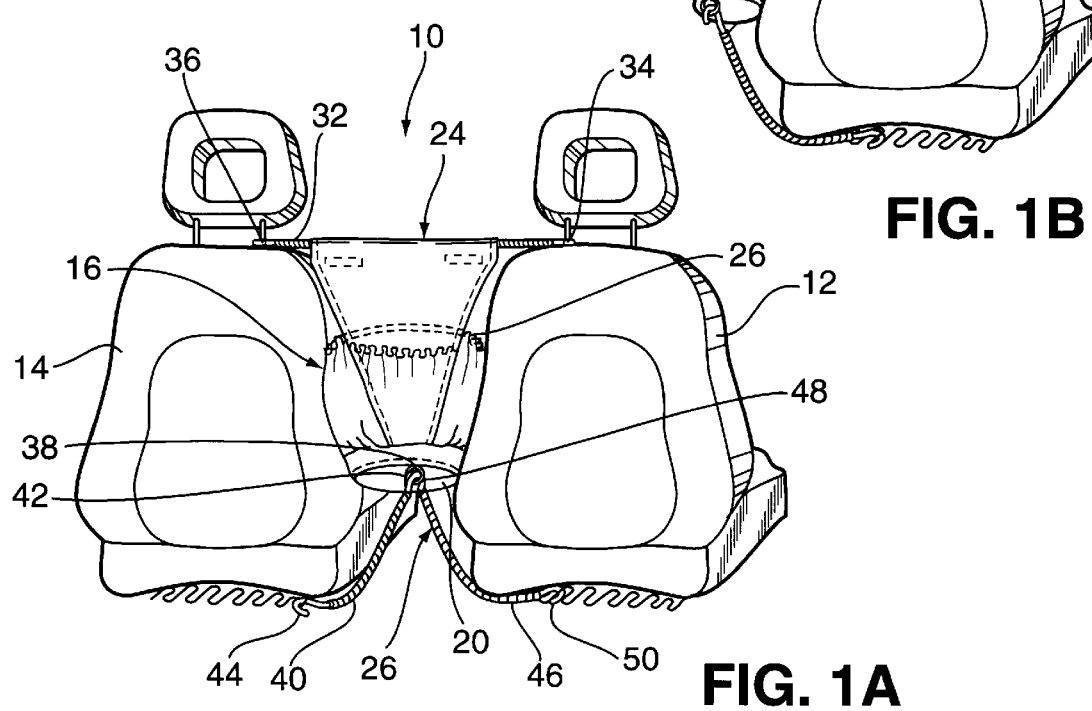

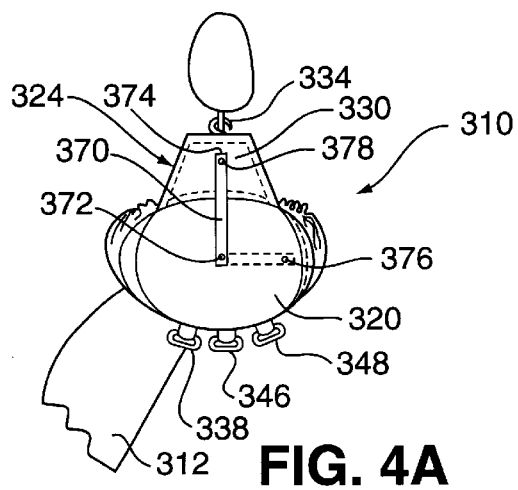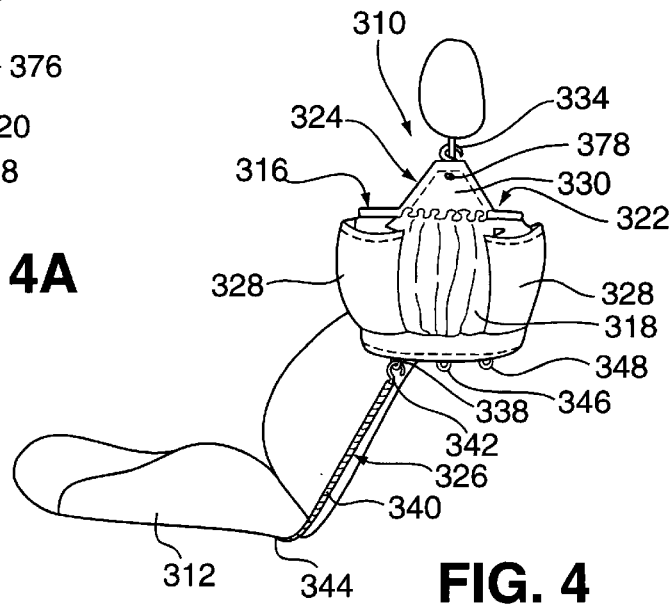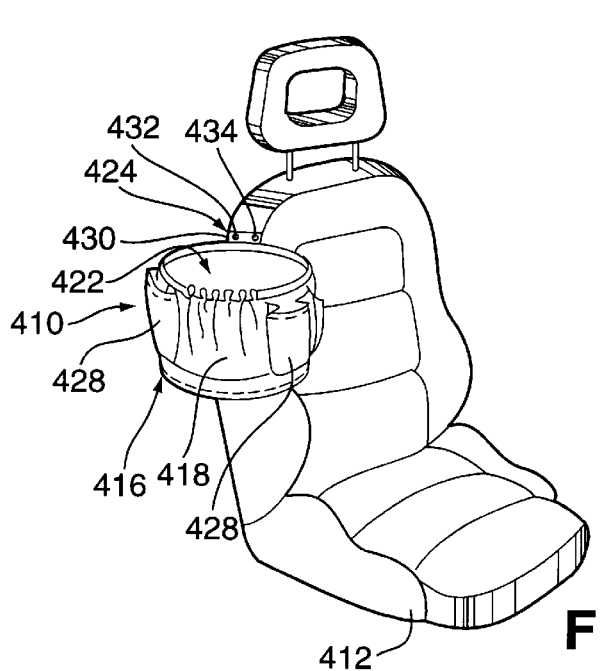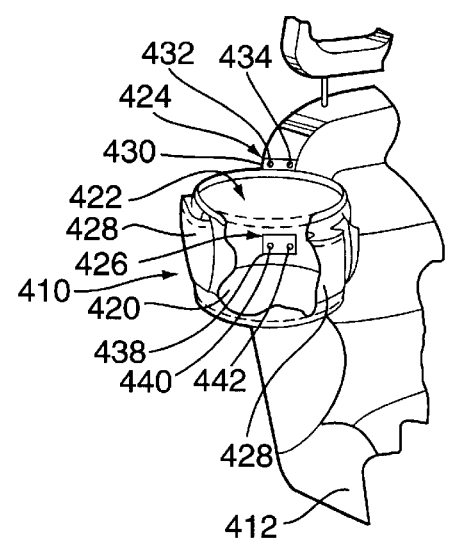

VEHICLE UTILITY RECEPTACLE

BACKGROUND OF THE INVENTION

The present invention relates generally to storage or waste receptacles for use in vehicle passenger compartments. In particular, the invention relates to a utility receptacle for safely and securely stowing personal objects or waste adjacent a seat position in a vehicle, within the convenient reach of the seat occupant.

For years vehicle operators and their passengers have fought the battle of trying to safely, securely and conveniently stow personal articles or waste within a vehicle. It is not unusual for individuals to seek to stow in vehicles items such as handbags, cassette tapes, compact discs, cellular phones, Dictaphones, toys, snacks and waste. Numerous methods and devices have been tried to temporarily retain such items, but with significant disadvantages.

For instance, placing an object directly on the front floor of a vehicle is unacceptable because the vehicle operator cannot reach the object easily while operating the vehicle. Also, an object on the vehicle floor reduces the available foot space, tends to move when the vehicle is driven, and is subjected to dirt and moisture carried into the vehicle by front seat occupants. Placing waste or a waste container directly on the floor is even more troublesome because it raises additional aesthetic and sanitary concerns. Using the rear floor of a vehicle imposes the same space, aesthetic and sanitary problems for rear seat occupants while further complicating the accessibility problem for front seat occupants.

After-market floor consoles were introduced long ago. Yet, floor consoles often require a raised center tunnel in the vehicle floor for mounting, a feature that is not as common on modern front wheel drive passenger vehicles. Moreover, such floor consoles tend to be unstable, reduce front passenger foot space, and obstruct air flow from floor level heating and cooling ducts. Original equipment floor consoles are more securely mounted and often provide spaces for holding items such as cups, coins, cassette tapes and ashes. However, not every vehicle is originally equipped with a floor console and the space for personal items tends to be very limited and insufficient for larger items commonly carried in vehicles, such as a handbag.

The alternative of placing personal articles, waste or a waste container on a seat is impractical because it reduces available seating and the items are prone to undesired movement and a tendency to fall to the floor when the vehicle is driven (resulting in the above mentioned problems).

Container assemblies that drape over the upright back portion of a seat are typically not securely fastened to the seat back and require bench style seating to permit easy access by the vehicle operator or a front seat passenger. Containers that are designed for attachment to the rear face of a front seat back carry the significant disadvantage of not being within convenient reach of the front seat occupants.

Devices for carrying and restraining animals in a vehicle generally do not provide adequate means to overcome the problem of holding personal objects or waste. Such devices typically are constructed to restrain an animal, not to carry objects of various sizes that also need to be readily accessible. Therefore, use with personal articles or waste would tend to impede the withdrawal of such items from the device.

Accordingly, the present invention is directed to a vehicle utility receptacle that provides secure mounting in a location that is convenient to seat occupants, and is adaptable to a variety of vehicle interior seating configurations.

More particularly, the present invention provides a vehicle utility receptacle that is mounted adjacent the side of a vehicle seat and is easily accessible to the seat occupant.

Another object of the present invention is to provide a receptacle that is capable of safely and securely holding frequently used relatively large objects, such as a handbag, without impeding retrieval of such items.

A further object of the present invention is to provide a vehicle utility receptacle to be attached to a plurality of seats in a manner that permits independent fore and aft movement of the seats.

Still another object of the present invention is to provide a vehicle utility receptacle that may be removably attached to a vehicle seat.

Another object of the present invention is to provide a vehicle utility receptacle that is waterproof.

SUMMARY OF THE INVENTION

The objects and advantages of the present invention are provided by a vehicle utility receptacle adapted to be mounted in a vehicle adjacent the side of a vehicle seat. The receptacle comprises an upward opening container having side walls and a bottom portion that joins the side walls. The receptacle further comprises an upper container-to-seat mounting assembly attached to the container and suitable for attachment to a vehicle seat. The receptacle further comprises a lower container-to-seat mounting assembly attached to the container and suitable for attachment to a vehicle seat.

In another aspect of the invention, the upper and lower container-to-seat mounting assemblies include elastomeric material.

In another aspect of the invention, the upper container-to-seat mounting assembly has attachment members for attachment to a plurality of seats.

In another aspect of the invention, the container is of rigid construction.

In yet another aspect of the invention, the container has a resealable panel.

In still another aspect of the invention, the container is waterproof.

In another aspect of the invention, the container is adapted to be mounted in a vehicle to a bench-style multiple passenger seat between two seat positions on the seat.

In still another aspect of the invention, the upper and lower container-to-seat mounting assemblies are attached to the side of a seat.

Further features and aspects of the present invention will become more fully apparent in the following description of the preferred embodiments of this invention and from the appended claims.

BRIEF DESCRIPTION OF THE DRAWINGS

In describing the preferred embodiments, reference is made to the accompanying drawings wherein like parts have like reference numerals, and wherein:

FIG. 1 is a front perspective view of a first embodiment of a vehicle utility receptacle embodying the present invention mounted to and adjacent a side of a pair of vehicle seats.

FIG. 1A is a rear perspective view of the first embodiment mounted to and adjacent a side of a pair of vehicle seats.

FIG. 1B is a cut-away rear perspective view of the first embodiment mounted to and adjacent a side of a vehicle seat of alternative construction.

FIG. 4 is a left perspective view of a fourth embodiment of a vehicle utility receptacle embodying the present invention mounted adjacent the left side of a vehicle seat.

FIG. 4A is a cut-away left perspective view of the fourth embodiment in a collapsed position.

FIG. 5 is a front right prospective view of a fifth embodiment of a vehicle utility receptacle embodying the present invention mounted to the right side of a vehicle seat.

FIG. 5A is a cut-away front right perspective view of the fifth embodiment to further illustrate the mounting to the right side of the vehicle seat.

Figure 2:
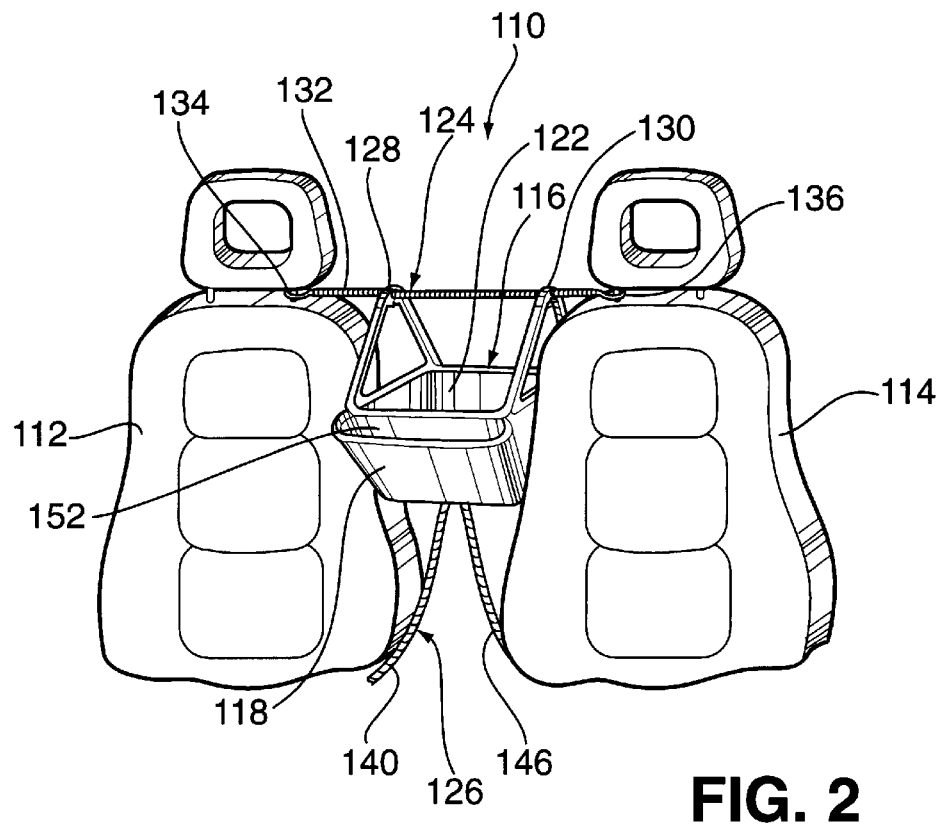
FIG. 2 is a front left perspective view of a second embodiment of a vehicle utility receptacle embodying the present invention mounted to and adjacent a side of a pair of vehicle seats.

It should be understood that the drawings are not to scale and that certain aspects of the embodiments are illustrated by phantom view. Actual embodiments may differ. While considerable mechanical details of a vehicle utility receptacle, including details of fastening or attaching means and other plan and section views of the particular embodiments depicting the invention are not shown, such detail is not per se part of the invention and is considered within the comprehension of those skilled in the art in light of the present disclose. It should also be understood that the invention is not limited to the particular embodiments illustrated or combinations thereof

DESCRIPTION OF THE PREFERRED EMBODIMENTS

Referring generally to FIGS. 1–5A, it will be appreciated that the present invention generally may be embodied in numerous configurations of a vehicle utility receptacle. The first preferred embodiment is depicted in FIGS. 1, 1A, and 1B and is followed by second, third, fourth, and fifth alternative embodiments shown in FIG. 2, FIG. 3, FIGS. 4 and 4A, and FIGS. 5 and 5A, respectively.

First Preferred Embodiment

Turning now to FIGS. 1 and 1A, the present invention is generally embodied in a vehicle utility receptacle 10 which is shown mounted adjacent the inner-facing sides of vehicle seats 12 and 14. The receptacle 10 is comprised of a container 16 having side walls 18, a bottom 20 joining the side walls 18, an opening 22, an upper container-to-seat mounting assembly 24, and a lower container-to-seat mounting assembly 26.

Container 16 may be constructed of any suitable fabric, or of a rigid material such as plastic, or of a combination of fabric and rigid materials. As depicted in FIG. 1, container 16 is constructed preferably of a light-weight, yet durable and flexible material such as nylon fabric. Although container 16 may be constructed of one thickness of material, for added strength, it is preferable to use two layers of material. Container 16 is held in an open position for easy access to its contents by means of polyester boning around the base and at the front and back of opening 22. Also in this embodiment, the side walls 18 of container 16 may be gathered along their upper edge 27 with elastic to help secure the contents of container 16 while making the opening 22 flexible enough to accommodate items of various sizes. For applications where receptacle assembly 10 will be used to hold food, beverages, or waste it is preferable to make container 16 of waterproof material, line container 16 with a permanent waterproof liner, or to use disposable waterproof liners. For added storage and convenience, container 16 has additional pocket structure 28 attached to the exterior of side walls 18.

As shown in FIGS. 1 and 1A, upper container-to-seat mounting assembly 24 comprises panel 30 and elastic cord 32 with attaching hooks 34 and 36 at its respective ends. Panel 30, preferably of the same type of flexible material as container 16, is folded over cord 32 and sewn to create a two-ply construction which, in turn, is attached to side walls 18 by conventional means such as sewing. In this embodiment, hooks 34 and 36 are attached to the inner-most headrest support posts on seats 12 and 14 respectively.

As best seen in FIG. 1A, lower container-to-seat mounting assembly 26 comprises a ring 38, elastic cord 40 with attaching hooks 42 and 44, and elastic cord 46 with attaching hooks 48 and 50. Ring 38 could be formed as an eyelet, and could be constructed of rigid material such as metal or plastic, or of flexible fabric, and is attached to the rear side wall or bottom 20 of container 16, by conventional means such as sewing or gluing. Cord 40 is attached to ring 38 and to the undercarriage of seat 14 by hooks 42 and 44 respectively. Cord 46 is similarly attached to ring 38 on receptacle 10 and to the undercarriage of seat 12 by hooks 48 and 50 respectively. Lower container-to-seat mounting assembly 26 helps steady receptacle 10 when the vehicle is in motion and holds bottom 20 downward to facilitate easy withdrawal of contents from container 16.

One skilled in the art will appreciate that upper and lower container-to-seat mounting assemblies 24 and 26 can be constructed with inelastic attaching means to attach container 16 to seats 12 and 14. However, use of elastic cords 32, 40 and 46 is preferred to permit the independent fore and aft movement of seats 12 and 14 and to reduce jarring motions transmitted to container 16 when the vehicle is driven. Similarly, cords 40 and 46 can be replaced by a single cord that passes through ring 38, but use of dual cords 40 and 46 provide the advantage of a biasing means to center receptacle 10. Also, receptacle 10 may be constructed using any number of techniques such as sewing, heat welding and gluing.

As an example of an alternative construction, FIG. 1B shows a cut-away view of the right half of an alternative first embodiment in which vehicle utility receptacle 10B is mounted to right vehicle seat 12B having integral headrest construction. As shown in this half of the alternative construction of the first embodiment, the modification involves upper container-to-seat mounting assembly 24B which comprises an inelastic flexible strap 32B and a conventional strap buckle 36B to permit attachment to seat 12B.

Second Preferred Embodiment

Turning now to FIG. 2, an alternative second embodiment of the present invention is shown. More particularly, a vehicle utility receptacle 110 is shown mounted adjacent the inner-facing sides of vehicle seats 112 and 114. The receptacle 110 is comprised of a container 116 having side walls 118, a bottom 120 (not shown) joining the side walls 118, an opening 122, an upper container-to-seat mounting assembly 124, and a lower container-to-seat mounting assembly 126. In this embodiment, container 116 is preferably constructed of any suitable rigid material such as plastic. Use of materials such as plastic would allow simple unitary molded construction of waterproof, highly durable containers for inexpensive mass production.

As depicted in FIG. 2, upper container-to-seat mounting assembly 124 comprises hanger arches 128 and 130 and elastic cord 132 with attaching hooks 134 and 136 at its respective ends. Hanger arches 128 and 130 preferably are integrally formed as upward extensions of container 116. Cord 132 passes through holes in hanger arches 128 and 130, and hooks 134 and 136 are attached to the inner-most headrest support posts on seats 112 and 114 respectively.

Lower container-to-seat mounting assembly 126 comprises a mounting eyelet (not shown), elastic cords 140 and 146 (partially shown) with attaching hooks (not shown), similar to the lower container-to-seat mounting assembly 26 of the embodiment shown in FIG. 1A. The eyelet is attached to the rear side wall or the bottom (not shown) of container 116, preferably by integrally forming the eyelet as a downward extension from the rear side wall or the bottom of container 116. Similarly to the embodiment shown in FIG. 1A, the elastic cords 140 and 146 are attached to the eyelet (not shown) and to the under carriage of seats 112 and 114.

The second preferred embodiment enjoys the same advantages of a dual cord lower container-to-seat mounting assembly and elastic mounting assembly means as in the first preferred embodiment. Container 116 also may be provided with one or more interior walls 152 of various heights to create separate compartments. The use of an interior wall 152 also provides enhanced container rigidity.

Third Preferred Embodiment

Figure 3:
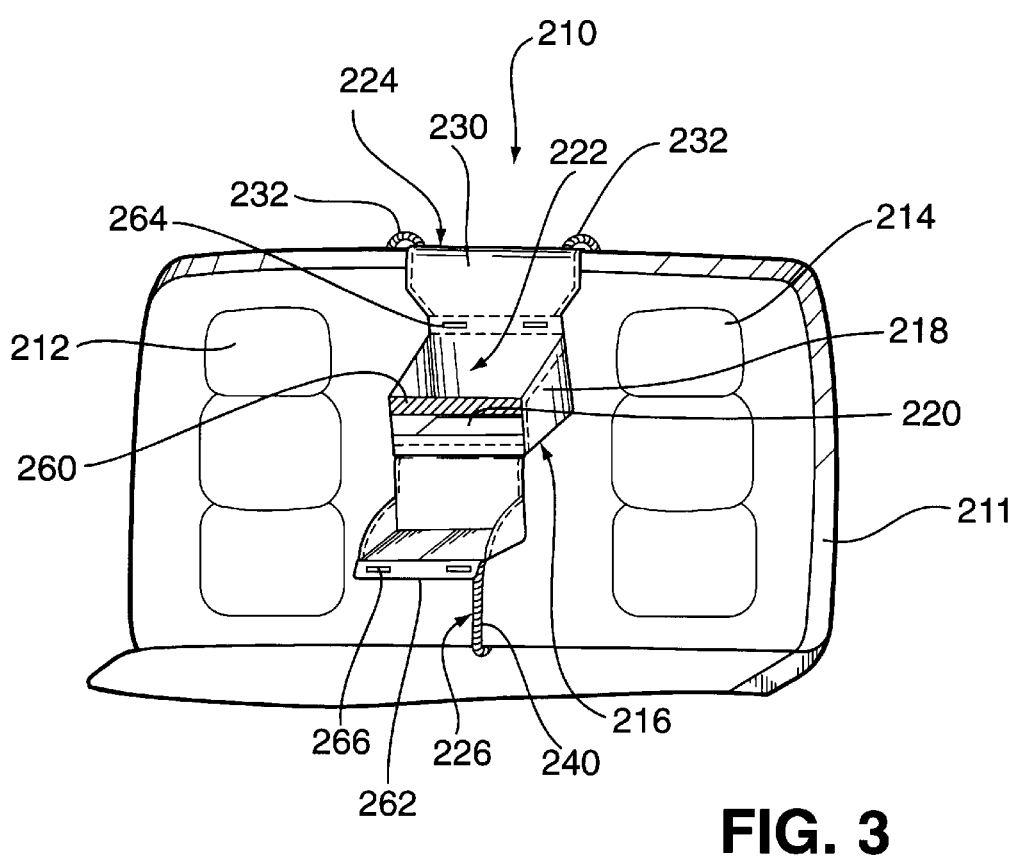
FIG. 3 is a front left perspective view of a third embodiment of a vehicle utility receptacle embodying the present invention mounted to a bench-style vehicle seat.

Referring now to FIG. 3, the present invention is alternatively embodied in a vehicle utility receptacle 210 which is shown attached to a bench-style vehicle seat 211 between seating positions 212 and 214. Bench-style seat 211 could be a front or rear vehicle seat. The receptacle 210 is comprised of a container 216 having side walls 218, a bottom 220 joining the side walls 218, an opening 222, an upper container-to-seat mounting assembly 224, and a lower container-to-seat mounting assembly 226.

As with container 16 the first preferred embodiment, container 216 may be constructed of any suitable fabric, or of a rigid material such as plastic, or of a combination of fabric and rigid materials. As shown in FIG. 3, container 216 is held in an open position for easy access to its contents by means of a multi-ply construction with a rigid material such as plastic sandwiched between two layers of a light-weight, yet durable and flexible material such as nylon fabric.

Upper container-to-seat mounting assembly 224 comprises panel 230, and inelastic strap 232 with conventional attaching hooks and length adjustment means (not shown). As shown in FIG. 3, panel 230 may be of integral construction but extend upward from container 216. Container 216 of receptacle 210 will not be suspended in mid air, but rather will be trapped against seat 211. Therefore, strap 232 may be sewn to panel 230 and the height of receptacle 210 can be adjusted by adjustment means (not shown) on the legs of strap 232 that reach down the back of seat 211 for attachment to the undercarriage of seat 211.

Lower container-to-seat mounting assembly 226 comprises a ring (not shown), and elastic cord 240 with an attaching hook (not shown). The ring may be of rigid or flexible material and is attached by conventional means such as sewing to bottom 220 or the rear side wall of container 216. Elastic cord 240 is attached to the ring and to the undercarriage of seat 211 by hooks (not shown). Alternatively, cord 240 could be attached directly to container 216 by conventional means such as sewing and to the undercarriage of seat 211 by a hook (not shown). The aforementioned fact that receptacle 210 will be trapped against seat 211 facilitates the use of a single elastic cord 240 in lower container-to-seat mounting assembly 226 to keep receptacle assembly 210 in tension and centered between seat positions 212 and 214.

The embodiment in FIG. 3 incorporates additional advantageous features. First, container 216 has an elastic band 260 to hold objects such as compact disc cartridges in an upright, orderly orientation. Next, container 216 has a resealable access panel 262 to provide covered stowage. In this embodiment, access panel 262 is held in its closed position by hook and loop type fasteners 264 and 266. Finally, with items that are sensitive to extreme temperatures such as cassette tapes and compact discs, the multi-ply construction of container 216 permits use of an insulating material as one of the layers of construction of the side walls 218, bottom 220 and access panel 262.

Fourth Preferred Embodiment

Turning now to FIGS. 4 and 4A, an alternative fourth embodiment of the present invention is shown. More particularly, a vehicle utility receptacle 310 is shown mounted adjacent the left side of vehicle seat 312. Receptacle 310 is comprised of a container 316 having side walls 318, a bottom 320 joining the side walls 318, an opening 322, an upper container-to-seat mounting assembly 324, and a lower container-to-seat mounting assembly 326. Container 316 can be constructed substantially similarly to container 16 of FIGS. 1 and 1A. For added storage and convenience, container 316 has additional forward and rearward pockets 328 attached to the exterior of side walls 318.

Upper container-to-seat mounting assembly 324 comprises panel 330 with attaching hook 334 for attachment to a headrest support post on seat 312. Panel 330 is preferably of the same type of flexible material as container 316, with hook 334 attached by conventional means to its upper end.

Lower container-to-seat mounting assembly 326 comprises a ring 338, and elastic cord 340 with attaching hooks 342 and 344 attached to the ends of cord 340. Additional rings or eyelets 346 and 348 can be offered to permit adjustment of receptacle 310 to maintain an upright angle regardless of the angle of the back of seat 312. Cord 340 is attached to ring 338 and to the undercarriage of seat 312 by hooks 342 and 344, respectively.

One can readily appreciate that employment of upper and lower container-to-seat assemblies 324 and 326 on a bucket-style seat would keep container 316 within convenient reach of the seat occupant by allowing receptacle 310 to travel with the seat when it is moved in the fore and aft directions, as well as when the seat back is adjusted for use at various angles.

FIG. 4A shows receptacle 310 held in a collapsed position. In a normal use position, strap 370 is attached to bottom 320 of container 316 at strap end 372 and releasably attached at strap end 374 to fastener 376 on bottom 320 as shown in phantom. When it is desired to collapse receptacle 310 for added interior space adjacent seat 312 to which it is mounted, strap 370 is detached at end 374 from fastener 376 on bottom 320 and end 374 is attached to fastener 378 on panel 330 of upper container-to-seat mounting assembly 324. Conventional fastening means may be employed to achieve various collapsed positions, such as by the use of hook and loop type fastener patches on the inner surfaces of bottom 320 and corresponding side walls 318 to enable container 316 to hold its collapsed position if squeezed shut. Such conventional fastening means may also be employed to achieve collapsed positions with the other flexible-walled preferred embodiments disclosed herein.

Fifth Preferred Embodiment

FIGS. 5 and 5A show an alternative fifth embodiment of the present invention. More particularly, a vehicle utility receptacle 410 is shown mounted adjacent and directly to the right side of vehicle seat 412. Receptacle 410 is comprised of a container 416 having side walls 418, a bottom 420 joining the side walls 418, an opening 422, an upper container-to-seat mounting assembly 424, and a lower container-to-seat mounting assembly 426. Container 416 can be constructed substantially similarly to container 16 of FIGS. 1 and 1A. As with container 316 in FIG. 4, for added storage and convenience, container 416 has additional forward and rearward pockets 428 attached to the exterior of side walls 418.

Upper container-to-seat mounting assembly 424 comprises panel 430 and attaching fasteners 432 and 434 for direct attachment to seat 412. Panel 430 is preferably of rigid material attached to side walls 418 by conventional means such as sewing. Fasteners 432 and 434, of conventional type such as sheet metal screws or rivets, pass through panel 430 and into seat 412 to attach container 416 to the side of seat 412.

Lower container-to-seat mounting assembly 426 comprises a panel 438, and attaching fasteners 440 and 442 for direct attachment to seat 412 as described above in relation to upper container-to-seat mounting assembly 424.

The above-described preferred embodiments are for illustration purposes only. It will be understood that various changes may be made in materials, form, arrangement of parts and other details without departing from the spirit or scope of the present invention which is set forth in the following claims.

What is claimed is:

1. A vehicle utility receptacle for use in a vehicle having a seat, said seat having a forward facing surface, a rearward facing surface, and a pair of opposed side surfaces therebetween, said receptacle adapted to be mounted adjacent one of said side surfaces and at least a substantial portion of said receptacle being forward of said rearward facing surface, said receptacle comprising:

an upward opening container comprising rigid side walls and a rigid bottom portion joining said side walls;

an upper container-to-seat mounting assembly attached to said container and suitable for attachment to said seat; and a lower container-to-seat mounting assembly attached to said container and suitable for attachment to said seat.

2. A vehicle utility receptacle in accordance with claim 1 wherein said upper container-to-seat mounting assembly comprises flexible elastomeric material.

3. A vehicle utility receptacle in accordance with claim 2 wherein said upper container-to-seat mounting assembly further comprises a rigid seat attachment member.

4. A vehicle utility receptacle in accordance with claim 1 wherein said lower container-to-seat mounting assembly comprises flexible elastomeric material.

5. A vehicle utility receptacle in accordance with claim 4 wherein said lower container-to-seat mounting assembly further comprises a rigid seat attachment member.

6. A vehicle utility receptacle in accordance with claim 1 wherein said upper container-to-seat mounting assembly comprises attachment members suitable for attachment to a plurality of seats.

7. A vehicle utility receptacle in accordance with claim 6 wherein said upper container-to-seat mounting assembly further comprises flexible elastomeric material to permit independent fore and aft movement of said seats to which said assembly is attached.

8. A vehicle utility receptacle in accordance with claim 1 wherein said lower container-to-seat mounting assembly comprises lower attachment members suitable for attachment to a plurality of seats.

9. A vehicle utility receptacle in accordance with claim 1 wherein said container side walls and bottom comprise waterproof material.

10. A vehicle utility receptacle in accordance with claim 1 wherein said container side walls further comprise pocket storage compartments.

11. A vehicle utility receptacle in accordance with claim 1 wherein said upper container-to-seat mounting assembly further comprises flexible material.

12. A vehicle utility receptacle in accordance with claim 1 wherein said upper and lower container-to-seat mounting assemblies each further comprise an attachment member suitable for attachment to said one side surface of said seat.

13. A vehicle utility receptacle adapted to be mounted in a vehicle adjacent a side of a vehicle seat, said vehicle having a plurality of seats, said receptacle comprising:

an upward opening container comprising rigid side walls and a rigid bottom portion joining said side walls;

an upper mounting assembly attached to said container, said upper mounting assembly further comprising flexible elastomeric material and attachment members suitable for attachment to a plurality of seats; and a lower mounting assembly attached to said container, said lower mounting assembly further comprising flexible elastomeric material and attachment members suitable for attachment to a plurality of seats.

14. A vehicle utility receptacle in accordance with claim 13 wherein said upper and lower mounting assemblies further comprise rigid seat attachment members.

15. A vehicle utility receptacle in accordance with claim 13 wherein said container side walls further comprise pocket storage compartments.

16. A vehicle utility receptacle in accordance with claim 13 wherein said container side walls and bottom are of rigid construction.

17. A vehicle utility receptacle adapted to be mounted in a vehicle between two seats, each of said seats having a headrest, headrest support and an undercarriage, said receptacle comprising:

an upward opening container having side walls and a bottom portion joining said side walls;

an upper container-to-seat mounting assembly attached to said container and suitable for attachment to a headrest support of each of said two seats;

a lower container-to-seat mounting assembly attached to said container and suitable for attachment to said undercarriage of each of said two seats.

18. A vehicle utility receptacle in accordance with claim 17 wherein said upper and lower container-to-seat mounting assemblies further comprise flexible elastomeric material.

19. A vehicle utility receptacle in accordance with claim 17 wherein said upper container-to-seat mounting assembly further comprises flexible material.

20. A vehicle utility receptacle in accordance with claim 17 wherein said container side walls and bottom are of rigid construction.

* * * * *